US012584029B2

(12) United States Patent
Guo et al.

(10) Patent No.: US 12,584,029 B2
(45) Date of Patent: Mar. 24, 2026

(54) AQUEOUS COATING COMPOSITION FOR FORMING THERMAL INSULATION COATING FOR WALLS AND REFLECTIVE THERMAL INSULATION COATING SYSTEM FOR WALLS CONTAINING THE THERMAL INSULATION COATING

(71) Applicant: Guangdong Huarun Paints Co., Ltd., Foshan (CN)

(72) Inventors: Qian Guo, Foshan (CN); Chen Liu, Foshan (CN)

(73) Assignee: SHERWIN-WILLIAMS (GUANGDONG) NEW MATERIAL CO., LTD., Guangdong (CN)

( * ) Notice: Subject to any disclaimer, the term of this patent is extended or adjusted under 35 U.S.C. 154(b) by 634 days.

(21) Appl. No.: 17/844,869

(22) Filed: Jun. 21, 2022

(65) Prior Publication Data

US 2022/0403186 A1    Dec. 22, 2022

(30) Foreign Application Priority Data

Jun. 22, 2021    (CN) .......................... 202110690358.1

(51) Int. Cl.
| | |
|---|---|
| *C09D 7/40* | (2018.01) |
| *C09D 5/00* | (2006.01) |
| *C09D 5/02* | (2006.01) |
| *C09D 7/65* | (2018.01) |
| *C09D 125/14* | (2006.01) |
| *C09D 133/06* | (2006.01) |
| *E04B 1/76* | (2006.01) |

(52) U.S. Cl.
CPC .............. *C09D 7/70* (2018.01); *C09D 5/002* (2013.01); *C09D 5/022* (2013.01); *C09D 7/65* (2018.01); *C09D 7/67* (2018.01); *C09D 7/68* (2018.01); *C09D 125/14* (2013.01); *C09D 133/062* (2013.01); *E04B 1/76* (2013.01)

(58) Field of Classification Search
CPC .......... C09D 5/002; C09D 5/022; C09D 7/65; C09D 7/67; C09D 7/68; C09D 7/70; C09D 125/14; C09D 133/062; E04B 1/76
See application file for complete search history.

(56) References Cited

U.S. PATENT DOCUMENTS

| | | | |
|---|---|---|---|
| 10,570,308 | B2 | 2/2020 | Van Westerhuizen-Markus et al. |
| 11,111,393 | B2 | 9/2021 | Muroi |
| 2005/0126441 | A1 | 6/2005 | Skelhorn |
| 2012/0126164 | A1 | 5/2012 | Cooray |
| 2013/0296461 | A1 | 11/2013 | Sadasivan |
| 2015/0176267 | A1 | 6/2015 | Casimiro et al. |
| 2018/0201792 | A1 | 7/2018 | Economos et al. |
| 2018/0362774 | A1 | 12/2018 | Muroi |
| 2019/0185698 | A1 | 6/2019 | Van Westerhuizen-Markus et al. |
| 2020/0032097 | A1 | 1/2020 | Darcy et al. |

FOREIGN PATENT DOCUMENTS

| | | | |
|---|---|---|---|
| CN | 1361186 | A | 7/2002 |
| CN | 1524909 | A | 9/2004 |
| CN | 101029206 | A | 9/2007 |
| CN | 101205436 | A | 6/2008 |
| CN | 101343453 | A | 1/2009 |
| CN | 101423686 | A | 5/2009 |
| CN | 101429786 | A | 5/2009 |
| CN | 101565581 | A | 10/2009 |
| CN | 101665658 | A | 3/2010 |
| CN | 101838493 | A | 9/2010 |
| CN | 102329545 | A | 1/2012 |
| CN | 102491647 | A | 6/2012 |
| CN | 102604500 | A | 7/2012 |
| CN | 101974274 | B | * 10/2012 |
| CN | 202595930 | U | 12/2012 |
| CN | 102864884 | A | 1/2013 |
| CN | 102993886 | A | 3/2013 |
| CN | 103374249 | A | 10/2013 |
| CN | 103773136 | A | 5/2014 |
| CN | 103865297 | A | 6/2014 |
| CN | 103865352 | A | 6/2014 |
| CN | 103937314 | A | 7/2014 |
| CN | 104087080 | A | 10/2014 |
| CN | 104098319 | A | 10/2014 |
| CN | 104650675 | A | 5/2015 |
| CN | 104804568 | A | 7/2015 |
| CN | 104910724 | A | 9/2015 |
| CN | 105199520 | A | * 12/2015 |
| CN | 105219249 | A | 1/2016 |
| CN | 105271931 | A | 1/2016 |
| CN | 105331231 | A | 2/2016 |
| CN | 105542087 | A | 5/2016 |
| CN | 105544748 | B | 5/2016 |
| CN | 105622003 | A | 6/2016 |
| CN | 105820637 | A | 8/2016 |
| CN | 105820681 | A | 8/2016 |
| CN | 105860717 | A | 8/2016 |
| CN | 106118307 | A | 11/2016 |

(Continued)

OTHER PUBLICATIONS

International Search Report and Written Opinion from corresponding International Application PCT/CN2022/100371 mailed on Oct. 20, 2022.

*Primary Examiner* — Maria V Ewald
*Assistant Examiner* — Ethan Weydemeyer
(74) *Attorney, Agent, or Firm* — Tucker Ellis LLP

(57) ABSTRACT

The present disclosure relates to an aqueous coating composition for forming a thermal insulation coating for walls and a reflective thermal insulation coating system for walls containing the thermal insulation coating. In particular, the aqueous coating composition comprises, based on the total weight of the aqueous coating composition, at least 65 wt % of an aqueous dispersion of polymer particles; at least 5 wt % of expanded organic polymer micro-beads; at least 10 wt % water; and 0 to 15 wt % of additional additives, comprising thickeners, dispersants, wetting agents, defoamers, pH adjustors, film-forming aids, hydrophobic agents, coupling agents, bactericides, and antifungal agents or any combination thereof.

20 Claims, No Drawings

(56)     References Cited

FOREIGN PATENT DOCUMENTS

| | | | |
|---|---|---|---|
| CN | 106752561 | A | 5/2017 |
| CN | 206189761 | U | 5/2017 |
| CN | 107033685 | A | 8/2017 |
| CN | 107216758 | A | 9/2017 |
| CN | 107286799 | A | 10/2017 |
| CN | 107603440 | A | 1/2018 |
| CN | 108410281 | A | 8/2018 |
| CN | 108467644 | A | 8/2018 |
| CN | 108951181 | A | 12/2018 |
| CN | 109337477 | A | 2/2019 |
| CN | 106830994 | B | 3/2019 |
| CN | 109415580 | A | 3/2019 |
| CN | 109651909 | A | 4/2019 |
| CN | 109836911 | A | 6/2019 |
| CN | 109836941 | A | 6/2019 |
| CN | 109913007 | A | 6/2019 |
| CN | 110306679 | A | 10/2019 |
| CN | 209686610 | U | 11/2019 |
| CN | 110527396 | B | 12/2019 |
| CN | 110669434 | A | 1/2020 |
| CN | 110746833 | A | 2/2020 |
| CN | 111217570 | A | 6/2020 |
| CN | 111321854 | A | 6/2020 |
| CN | 211499249 | U | 9/2020 |
| CN | 111826045 | A | 10/2020 |
| CN | 211714430 | U | 10/2020 |
| CN | 112080193 | A | 12/2020 |
| CN | 112126291 | A | 12/2020 |
| CN | 112175461 | A | 1/2021 |
| CN | 112194449 | A | 1/2021 |
| CN | 112226103 | A | 1/2021 |
| CN | 106700789 | B * | 3/2021 |
| CN | 112724732 | A | 4/2021 |
| CN | 112898839 | A | 6/2021 |
| CN | 113429841 | A | 9/2021 |
| CN | 113583561 | A | 11/2021 |
| EP | 3006513 | A1 | 4/2016 |
| EP | 3594291 | A1 | 1/2020 |
| EP | 3481903 | B1 | 8/2021 |
| EP | 2871169 | B1 | 1/2022 |
| KR | 20210099845 | A | 8/2021 |
| WO | 2014033545 | A1 | 3/2014 |
| WO | 2014195529 | A1 | 12/2014 |
| WO | 2015155280 | A1 | 10/2015 |
| WO | 2016094245 | A1 | 6/2016 |
| WO | 2020253732 | A1 | 12/2020 |
| WO | 2021046280 | A1 | 3/2021 |

* cited by examiner

AQUEOUS COATING COMPOSITION FOR FORMING THERMAL INSULATION COATING FOR WALLS AND REFLECTIVE THERMAL INSULATION COATING SYSTEM FOR WALLS CONTAINING THE THERMAL INSULATION COATING

CROSS-REFERENCE TO RELATED APPLICATIONS

This application claims the benefit of Chinese Patent Application No. 202110690358.1, filed Jun. 22, 2021, which is incorporated by reference herein in its entirety.

TECHNICAL FIELD

The present disclosure relates to an aqueous coating composition for forming a thermal insulation coating for walls and a reflective thermal insulation coating system for walls containing the thermal insulation coating.

BACKGROUND OF THE INVENTION

At present, with the increasing economic development, the issue of energy consumption has attracted more and more attention. As a major energy consumer, building energy consumption accounts for about 30% to 40% of the National energy consumption each year. Therefore, how to reduce building energy consumption has become the most urgent issue to be solved in various energy-saving researches.

Building energy conservation is mainly achieved based on the two aspects including heat preservation and heat insulation, both of which are measures taken to keep indoor room at a suitable temperature. Heat preservation generally refers to the measure that allows the maintenance structure to prevent heat transfer from the indoor room to the outside in winter, and to keep the indoor room at a proper temperature; and heat insulation usually refers to the measure that allows the maintenance structure to isolate the influence of solar radiation heat and outdoor high temperature in summer and to keep its indoor room at a proper temperature. Among thermal insulation materials for building, thermal insulation coatings or coating systems are becoming more and more popular due to the advantages of easy to use, good thermal insulation effect and economic feasibility.

At present, the thermal insulation layer for building is mainly based on inorganic foamed cement board, rock wool board (belt), and inorganic thermal insulation mortar, accompanied by a finish coating containing hollow micro-beads and vitrified micro-beads. This kind of product is mainly an integral decorative panel, which needs to be made in the factory and assembled on site, so its flexibility is low. When encountering special-shaped building structures, the applicability of this product is limited.

Therefore, there is still a need for improved thermal insulation coatings in the coatings industry.

SUMMARY

In one aspect, the present disclosure provides an aqueous coating composition for forming a thermal insulation coating for walls, comprising, based on the total weight of the aqueous coating composition, at least 65 wt % of an aqueous dispersion of polymer particles; at least 5 wt % of expanded organic polymer micro-beads; at least 10 wt % water; 0 to 5 wt % of an aerogel; and 0 to 15 wt % of additional additives, comprising thickeners, dispersants, wetting agents, defoamers, pH adjustors, film-forming aids, hydrophobic agents, coupling agents, bactericides, and antifungal agents or any combination thereof, wherein the aqueous coating composition is substantially free of an inorganic mineral filler.

In one embodiment of the present disclosure, the aqueous coating composition for forming a thermal insulation coating for walls, comprising, based on the total weight of the aqueous coating composition, 65 wt % to 80 wt % of an aqueous dispersion of polymer particles; 5 wt % to 15 wt % of expanded organic polymer micro-beads; 10 wt % to 12 wt % of water; 0.1 to 4 wt % of an aerogel; and 0.1 to 10 wt % of additional additives, comprising thickeners, dispersants, wetting agents, defoamers, pH adjustors, film-forming aids, hydrophobic agents, coupling agents, bactericides, and antifungal agents or any combination thereof, wherein the aqueous coating composition is substantially free of an inorganic mineral filler.

In another aspect, the present disclosure provides a reflective thermal insulation coating system for walls, comprising a thermal insulation coating formed from the aqueous coating composition of the present disclosure. In one embodiment of the present disclosure, the reflective thermal insulation coating system for walls comprises (A) a hydrophobic primer, having a water permeability of at most 0.3 mL/24 hours;

(B) a thermal insulation coating formed from the aqueous coating composition according to any one of claims 1 to 9; and (C) a thermal reflective top coat, having a solar reflectance of at least 85% and/or a hemispherical emittance of at least 85%.

It is surprisingly found by the inventors that, without the addition of additional inorganic mineral fillers, the combination of hollow materials with excellent thermal insulation properties, especially expanded organic polymer micro-beads with a significant amount (for example, at least 65 wt % relative to the total amount of the aqueous coating composition) of aqueous dispersion of polymer particles can obtain an aqueous coating composition for forming a thermal insulation coating for walls with excellent storage stability. The aqueous coating composition can be stored for a long time without delamination. In addition, the thermal insulation coating for walls formed by such an aqueous coating composition has excellent elasticity, can well resist the problem of substrate cracking, is suitable for special-shaped building structures, and can achieve good thermal insulation effects with a low thickness.

Moreover, it is further surprisingly found by the inventors that the thermal insulation coating for walls formed by the above-mentioned aqueous coating composition can produce a synergistic effect when it is combined with a hydrophobic primer with a higher resin content and a heat reflective topcoat to forming a coating system with good superposition of heat reflection performance and heat insulation performance.

In addition, the aqueous coating composition for forming heat insulation coating for walls according to the present disclosure is easy to apply, convenient to operate, and suitable for large-scale popularization and application.

Selected Definitions

As used herein, "a", "an", "the", "at least one", and "one or more" are used interchangeably. Thus, for example, a coating composition that comprises "an" additive can be interpreted to mean that the coating composition includes "one or more" additives. Unless otherwise stated herein, the use of the singular form in this disclosure is also intended to include the plural form.

Throughout the present disclosure, where compositions are described as having, including, or comprising specific components or fractions, or where processes are described as having, including, or comprising specific process steps, it is contemplated that the compositions or processes as disclosed herein may further comprise other components or fractions or steps, whether or not, specifically mentioned in the present disclosure, as along as such components or steps do not affect the basic and novel characteristics of the present disclosure, but it is also contemplated that the compositions or processes may consist essentially of, or consist of, the recited components or steps.

For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited. Additionally, within a range includes every point or individual value between its end points even though not explicitly recited. Thus, every point or individual value may serve as its own lower or upper limit combined with any other point or individual value or any other lower or upper limit, to recite a range not explicitly recited.

As used herein, the term "expanded organic polymer micro-beads" refers to hollow thermoplastic acrylic polymer micro-beads, which are expanded micro-beads that have undergone a thermal expansion processing process, and basically do not undergo further expansion during heating conditions and which different from "expandable organic polymer micro-beads".

In the context of "expanded organic polymer micro-beads", the term "moisture content" is a parameter used to measure the water content in the expanded organic polymer micro-beads in the form of wet powder. Specifically, in some embodiments according to the present disclosure, the expanded organic polymer micro-beads in the form of wet powder are composed of expanded organic polymer micro-beads, water, and other solvents in which relative to the total weight of the expanded organic polymer micro-beads in the form of wet powder, the water content is at least 70 wt % or higher, preferably 75 wt % or higher.

In the context of "expanded organic polymer micro-beads", the term "solid content" is a parameter used to measure the content of expanded organic polymer micro-beads in the expanded organic polymer micro-beads in the form of wet powder. Specifically, in some embodiments according to the present disclosure, the expanded organic polymer micro-beads in the form of wet powder are composed of expanded organic polymer micro-beads, water, and other solvents in which relative to the total weight of the expanded organic polymer micro-beads in the form of wet powder, the content of the expanded organic polymer micro-beads is in the range of 15-20 wt %.

In the context of the present disclosure, the term "inorganic mineral filler" refers to a processed powder material with a certain chemical composition, geometric shape and surface characteristics, formed by processing inorganic minerals or non-metallic minerals as primary raw materials. In terms of chemical composition, the inorganic mineral fillers can be divided into oxides or hydroxides, carbonates, sulfates, silicates, carbonaceous and composite mineral fillers. In an embodiment of the present disclosure, the aqueous coating composition is substantially free of "inorganic mineral fillers". In such an embodiment, the phrase "the aqueous coating composition is substantially free of inorganic mineral fillers" means that components of the aqueous coating composition and the coating composition as formulated do not contain any additional inorganic mineral fillers mentioned above, preferably does not contain any inorganic mineral fillers known in the art. When the phrase "substantially free" is used herein, such a phrase is not intended to exclude the presence of trace amounts of related inorganic mineral fillers that may exist as environmental pollutants or due to environmental pollution.

As used herein, the term "water permeability" is a measure of both the hydrophobicity and porosity of a coating. Specifically, the water permeability refers to the amount of water that penetrates through the coating in a specific period of time, such as 24 hours, under ambient conditions, such as room temperature (25° C.) and atmospheric pressure. Generally speaking, the water permeability of a coating for building walls is less than or equal to 0.5 mL/24 hours. In the present disclosure, the water permeability of the hydrophobic primer is at most 0.3 mL/24 hours, but may be greater than or equal to 0.15 mL/24 hours, or greater than or equal to 0.1 mL/24 hours.

As used herein, the term "solar reflectance" refers to a ratio of the solar radiation flux reflected by an object into a hemispherical space to the solar radiation flux incident on the surface of the object. In the present disclosure, the solar reflectance of the heat reflective topcoat is at least 85%.

As used herein, the term "hemispherical emittance" as used herein refers to a ratio of the radiation output of a radiation source in a hemispherical direction to the radiation output of a black body radiation source with the same temperature. In the present disclosure, the hemispherical emittance of the heat reflective topcoat is at least 85%.

As used herein, the term "thermal conductivity" refers to the amount of heat conduction through a unit thickness of maintenance structure in a unit time under the condition that the air temperature difference between two sides of the maintenance structure formed by building walls is 1K, in W/(mK).

The term "on", when used in the context of a coating applied on a surface or substrate, includes both coatings applied directly or indirectly to the surface or substrate. Thus, for example, a coating applied to a primer layer overlying a substrate constitutes a coating applied on the substrate.

As used therein, the term "wall" includes interior or exterior walls of a building. The aqueous coating composition for forming a thermal insulation coating for walls and the coating system contained the same are preferably applied to exterior walls of building.

The term "comprises" and variations thereof do not have a limiting meaning where these terms appear in the description and claims.

Also herein, the recitations of numerical ranges by endpoints include all numbers subsumed within that range (e.g., 1 to 5 includes 1, 1.5, 2, 2.75, 3, 3.80, 4, 5, etc.). Furthermore, disclosure of a range includes disclosure of all subranges included within the broader range (e.g., 1 to 5 discloses 1 to 4, 1.5 to 4.5, 1 to 2, etc.).

The terms "preferred" and "preferably" refer to embodiments of the present disclosure that may afford certain benefits, under certain circumstances. However, other embodiments may also be preferred, under the same or other circumstances. Furthermore, the recitation of one or more preferred embodiments does not imply that other embodiments are not useful, and is not intended to exclude other embodiments from the scope of the present disclosure.

DETAILED DESCRIPTION

Embodiments of the present disclosure in one aspect provides an aqueous coating composition for forming a thermal insulation coating for walls, comprising, based on the total weight of the aqueous coating composition, at least 65 wt % of an aqueous dispersion of polymer particles; at least 5 wt % of expanded organic polymer micro-beads; at least 10 wt % water; 0 to 5 wt % of an aerogel; and 0 to 15 wt % of additional additives, comprising thickeners, dispersants, wetting agents, defoamers, pH adjustors, film-forming aids, hydrophobic agents, coupling agents, bactericides, and antifungal agents or any combination thereof, wherein the aqueous coating composition is substantially free of an inorganic mineral filler.

As described above, in the embodiment according to the present disclosure, the aqueous coating composition is substantially free of inorganic mineral fillers. As we all know, in the formulation of a coating composition, a certain amount of inorganic mineral fillers is usually added to the coating composition to improve the mechanical strength of the coating formed therefrom. In the field of coatings, commonly used inorganic mineral fillers include but are not limited to oxides or hydroxides, such as magnesium oxide, aluminum oxide, calcium oxide, magnesium hydroxide, aluminum hydroxide, calcium hydroxide, titanium dioxide, etc.; silicates, such as talc powder, mica powder, kaolin, calcined kaolin, wollastonite, diatomaceous earth, quartz powder, feldspar powder, bentonite, sepiolite, attapulgite, asbestos, zircon, etc.; carbonates, such as calcium carbonate, magnesium carbonate, etc.; sulfates, such as gypsum powder, barium sulfate, alunite, etc.; composite mineral fillers, such as calcium sulfate/wollastonite composite filler, magnesium hydroxide/aluminum hydroxide composite filler; talc/diopside composite filler and the like. However, in the embodiments according to the present disclosure, when formulating the aqueous coating composition for forming a thermal insulation coating for walls, it is necessary to reduce or even avoid the addition of inorganic mineral fillers, because the addition of inorganic mineral fillers will lead to thermal conductivity coefficient of the coating to rise, thereby reducing the thermal insulation performance of the coating. Therefore, in a preferred embodiment according to the present disclosure, the aqueous coating composition is free of inorganic mineral fillers.

In an embodiment according to the present disclosure, the aqueous coating composition for forming a thermal insulation coating for walls comprises a significant amount (for example, at least 65 wt % relative to the total weight of the aqueous coating composition) of aqueous dispersion of polymer particles, which is significantly higher the amount of aqueous dispersion of polymer particles used in conventional aqueous coating compositions. It is surprisingly found by the inventors that, in the preparation of an aqueous coating composition for forming a thermal insulation coating for walls, the combination of the above-mentioned significant amount of aqueous dispersion of polymer particles and the expanded organic polymer micro-beads can not only provide coatings with excellent elasticity so as to solve the problem of substrate cracking, and can also solve the technical problem of poor stability of the expanded organic polymer micro-beads in aqueous dispersions, which was difficult to foresee prior to this application. As we all know, as a material with excellent thermal insulation properties, expanded polymer micro-beads can provide coatings with excellent thermal insulation properties. However, such expanded polymer micro-beads are particularly prone to delamination in aqueous systems, which leads to system instability. Without being bound by any theory, the inventors of the present disclosure believes that in an aqueous coating composition formulated with expanded organic polymer micro-beads, the presence of a larger amount of aqueous dispersion of polymer particles can effectively serve as dispersing the polymer micro-beads, so that they can be stably dispersed in an aqueous system without lamination. Therefore, in a preferred embodiment according to the present disclosure, the aqueous dispersion of polymer particles is present in an amount of 65-80 wt % based on the total weight of the aqueous coating composition.

As used herein, the term "an aqueous latex" refers to an emulsion or aqueous dispersion of natural resin or synthetic resin (i.e. polymer) formed in the form of particles in an aqueous medium. Therefore, unless expressly indicated otherwise, the terms "aqueous latex", "emulsion" and "aqueous dispersion", as used herein in the context of a polymer, can be interchangeably used. The aqueous dispersion or latex of polymer may be produced, for example, through an emulsion polymerization process, alternatively may be obtained by re-dispersing polymers prepared by otherwise polymerization processes into an aqueous medium. Suitable emulsion polymerization processes are well known to a person skilled in the art, and generally comprise the steps of dispersing and emulsifying polymerizable monomers into water with the aid of, as appropriate, an emulsifier or a dispersion stabilizer under agitation; and initiating polymerization of the monomers, e.g., by adding an initiator. According to the present disclosure, the polymeric particles can be modified by, for example, incorporating therein some organic functionalities including, but not limited thereto, one or more carboxyl, hydroxyl, amino, isocyanate, sulphonic groups or the like, whereby the aqueous latex can be obtained with desirable properties such as dispersibility. Therefore, the term "aqueous latex" or "aqueous dispersion" as used herein encompasses a dispersion or latex of unmodified polymeric particles in an aqueous medium and also a dispersion or latex of organo-functional modified polymeric particles in an aqueous medium. The size of the polymeric particles of the aqueous dispersion or latex may be measured in terms of the z-average particle size which is well known in the art. The z-average particle size can be determined according to the dynamic light scattering method by using, for example, a Malvern ZETASIZER 3000HS microscopic particle-size analyzer. The polymeric particles of the aqueous latex as disclosed herein have a z-average particle size of at most 200 nm, preferably at most 150 nm, more preferably less than 130 nm, still more preferably less than 125 nm, and even more preferably less than 110 nm. However, the z-average particle size of the polymeric particles in the aqueous latex is preferably at least 50 nm, more preferably at least 80 nm or more.

In an embodiment of the present disclosure, in the aqueous coating composition for forming a thermal insulation coating for walls, the aqueous dispersion of polymer particles comprises aqueous dispersion of organic silicones, aqueous dispersion of styrenes-acrylates polymer, aqueous dispersion of acrylates polymer, aqueous dispersion of organic silicones modified acrylates polymer, aqueous dispersion of vinyl acetate polymer, aqueous dispersion of vinyl acetate-acrylates polymer, aqueous dispersion of vinyl acetate-ethylene polymer, aqueous dispersion of ethylene-vinyl acetate polymer and aqueous dispersion of vinyl acetate-acrylates-esters of versatic acid (e.g., that available under the trademark VEOVA™ 10 from Momentive) polymer or any combination thereof.

In a particular embodiment of the present disclosure, in the aqueous coating composition for forming a thermal insulation coating for walls, the aqueous dispersion of polymer particles comprises a combination of aqueous dispersion of styrenes-acrylates polymer and aqueous dispersion of acrylates polymer.

As described above, the aqueous dispersion or latex may be prepared by any suitable emulsion polymerization processes which are well known to a person skilled in the art. Alternatively, as a particular example of the aqueous latex, a variety of suitable commercially available products can be used, such as aqueous latex of styrenes-acrylates polymer available from BATF Industry Co., Ltd. under the trademarks RS 998A, or RS 968; aqueous latex of acrylates polymer available from Wanhua Chemical Company, under the trademark Archsol® 8016.

In an embodiment according to the present disclosure, a certain amount of expanded organic polymer micro-beads is included in the aqueous coating composition for forming a thermal insulation coating for walls, thereby providing a coating with thermal insulation effect. As mentioned above, the expanded organic polymer micro-beads are hollow spheres, which kind of micro-beads are usually evenly arranged to form a dense and continuous vacuum-like structure during the coating film formation process, so that the resulting coating has an excellent thermal insulation effect. According to the present disclosure, based on the total weight of the aqueous coating composition, the expanded organic polymer micro-beads are present in an amount of at least 5 wt %, but preferably not more than 20 wt %. If the amount of expanded organic polymer micro-beads is too low, it will be difficult to form a dense and continuous vacuum-like structure during the film formation process, and it will be difficult to obtain the desired insulation effect. If the amount of expanded organic polymer micro-beads is too high, the aqueous coating composition formulated therefrom is easy to delaminate and cannot exist in the form of a stable composition. Therefore, in a preferred embodiment according to the present disclosure, the expanded organic polymer micro-beads is present in an amount of 5 to 15 wt % based on the total weight of the aqueous coating composition.

In one embodiment according to the present disclosure, the expanded organic polymer micro-beads are in the form of wet powder. As described above, the expanded organic polymer micro-beads in the form of wet powder are composed of expanded organic polymer micro-beads, water, and other solvents, which comprises a relatively high water content. The inventors of the present disclosure found that the higher the water content of the expanded organic polymer micro-beads, the better their compatibility with other components in the aqueous coating composition is, and the better their dispersibility in the aqueous coating composition is. Therefore, it is important to use expanded organic polymer micro-beads with higher water content for obtaining an aqueous coating composition with excellent storage stability. Preferably, the expanded organic polymer micro-beads have a moisture content of 70% or higher, preferably a moisture content of 75% or higher, and more preferably a moisture content of 80% or higher. Moreover, the expanded organic polymer micro-beads have a solid content of 15-20 wt %, preferably a solid content of 15-18 wt %.

In one embodiment according to the present disclosure, the expanded organic polymer micro-beads are hollow fine micro-beads. In one embodiment, the expanded organic polymer micro-beads are hollow micro-beads with an acrylic resin shell. The average particle size of the expanded organic polymer micro-beads, namely D50, can be varied in a wide range, for example, preferably in the range of about 50 to about 100 microns, more preferably in the range of about 60 to about 90 microns.

As an example of the expanded organic polymer micro-beads, any suitable commercially available product can be used, such as expanded micro-beads MH-60W16 or MH-80W15 commercially available from Matsuo China.

In an embodiment according to the present disclosure, a certain amount of water may be included in the aqueous coating composition for forming a thermal insulation coating for walls to adjust viscosity of the aqueous coating composition. For example, the aqueous coating composition for forming a thermal insulation coating for walls according to the present disclosure comprises at least 10% by weight of water, and preferably 10-12% by weight of water. Of course, in the aqueous coating composition for forming a thermal insulation coating for walls according to the present disclosure, the addition amount of water can be varied within a wider range as required, or even fall outside the above-mentioned range.

In an embodiment according to the present disclosure, a certain amount of aerogel may optionally be included in the aqueous coating composition for forming a thermal insulation coating for walls to further improve thermal insulation effect of the coating. For example, the aqueous coating composition for forming a thermal insulation coating for walls according to the present disclosure comprises 0 to 5 wt % of aerogel, preferably 0.1-4 wt % of aerogel. Of course, in the aqueous coating composition for forming a thermal insulation coating for walls according to the present disclosure, the addition amount of aerogel can be varied in a wider range as required, or even fall outside the above-mentioned range.

In an embodiment according to the present disclosure, the aqueous coating composition used to form a thermal insulation coating for walls may optionally comprises additional additives, which will not adversely affect the aqueous coating composition or the cured coating obtained therefrom. Suitable additives include, for example, those that improve processing or manufacturing properties of the composition, those that improve specific functional properties or characteristics (such as adhesion to the substrate) of the aqueous coating composition or the cured coating obtained therefrom, or those that reduce the cost. The additives that can be included are, for example, thickeners, dispersants, wetting agents, defoamers, pH adjusters, film-forming aids, hydrophobic agents, coupling agents, bactericides, antifungal agents, lubricants, plasticizers, surfactants, colorants, antioxidants, flow control agents, thixotropic agents, adhesion promoters, UV stabilizers, or combinations thereof. The content of each optional ingredient is sufficient to achieve its intended purpose, but preferably, such content does not adversely affect the aqueous coating composition or the cured coating obtained therefrom. In a preferred embodiment, the aqueous coating composition of the present disclosure may also optionally include thickeners, dispersants, wetting agents, defoamers, pH adjustors, film-forming aids, hydrophobic agents, coupling agents, bactericides, and antifungal agents or any combination thereof. According to the present disclosure, the total amount of additional additives relative to the total weight of the aqueous coating composition is in the range of 0 wt % to about 15 wt %, preferably in the range of 0.1-10 wt %.

In a preferred embodiment according to the present disclosure, the aqueous coating composition for forming a thermal insulation coating for walls, comprises based on the total weight of the coating composition, 65 to 80 wt % of the aqueous dispersion or latex;

5 to 15 wt % of the expanded organic polymer micro-beads;

10 to 12 wt % of water;

0.1 to 4 wt % of the aerogel; and 0.1-10 wt % of additional additives, the additional additives comprising thickeners, dispersants, wetting agents, defoamers, pH adjustors, film forming aids, hydrophobic agents, coupling agents, bactericides, and antifungal agents or any combination thereof.

In one embodiment according to the present disclosure, the aqueous coating composition has a solid content of 70 wt % or higher, which is significantly higher than the solid content of the traditional aqueous coating composition of 40%.

In one embodiment according to the present disclosure, the aqueous coating composition is allowed to stand at room temperature for 1 week or longer, preferably 1 month or longer, still more preferably 3 months or longer, even more preferably 6 months or longer, without lamination.

The aqueous coating composition for forming a thermal insulation coating for walls of the present disclosure can be prepared by any suitable mixing method known to those skilled in the art. For example, the aqueous coating composition can be made by adding an aqueous emulsion, expanded organic polymer micro-beads, water, aerogel and additional additives to a container, and then stirring the resulting mixture until uniform. Alternatively, the aqueous coating composition can be made by mixing a part of the additional additives with the expanded organic polymer micro-beads, aqueous emulsion, water and aerogel and then mixing the resulting mixture with the remaining additional additives to form a homogeneous mixture.

The aqueous coating composition for forming a thermal insulation coating for walls of the present disclosure can be applied by conventional methods known to those skilled in the art. For example, the aqueous coating composition can be applied by spray gun, roller or brush. In this way, a thermal insulation coating can be formed from the aqueous coating composition of the present disclosure, and thus the coating also falls within the protection scope of the present disclosure.

Therefore, in another aspect of embodiments of the present disclosure, a reflective thermal insulation coating system for walls is provided, which includes the thermal insulation coating formed from the above-mentioned aqueous coating composition of the present disclosure.

In an embodiment according to the present disclosure, the thermal insulation coating is has a thickness in the range of 1-5 mm. In a specific embodiment according to the present disclosure, the wet film thickness and the dry film thickness of the thermal insulation coating are both in the range of 1-5 mm.

In an embodiment according to the present disclosure, the thermal insulation coating has an elongation at break in the range of 50%-120%.

In an embodiment according to the present disclosure, the thermal insulation coating has a thermal conductivity of 0.050 w/m·K or lower.

In one embodiment according to the present disclosure, the reflective thermal insulation coating system for walls according to the present disclosure comprises (a) a hydrophobic primer, having a water permeability of at most 0.3 mL/24 hours; (b) the thermal insulation coating mentioned as above; and (c) a thermal reflective topcoat, having a solar reflectance of at least 85% and/or a hemispherical emittance of at least 85%.

In a more specific embodiment of the present disclosure, the reflective thermal insulation coating system for walls includes a putty layer, a hydrophobic primer, the thermal insulation coating according to the above-mentioned embodiment of the present disclosure, and a thermal reflective topcoat.

Hydrophobic Primer

The hydrophobic primer of the present disclosure is formed from a first coating composition, wherein the first coating composition comprises at least 30 wt % of an aqueous latex based on the total weight of the first coating composition.

The first coating composition of the present disclosure further includes an aqueous latex. The aqueous latex may have the same or similar composition as the aqueous latex involved in the aforementioned aqueous coating composition for forming a thermal insulation coating, but may also be a different aqueous latex. Preferably, the aqueous latex in the first coating composition is the same as or similar to the aqueous latex in the aqueous coating composition for forming a thermal insulation coating to facilitate adhesion between the coatings.

In some embodiments of the present disclosure, the aqueous latex in the first coating composition comprises aqueous dispersion of vinyl acetate polymer, aqueous dispersion of acrylates polymer, aqueous dispersion of organic silicones, aqueous dispersion of polyurethane, aqueous dispersion of fluoro polymers or any combination thereof. Preferably, the aqueous latex in the first coating composition for forming the hydrophobic primer comprises aqueous dispersion of organic silicones, aqueous dispersion of styrenes-acrylates polymer, aqueous dispersion of acrylates polymer, aqueous dispersion of organic silicones modified acrylates polymer, aqueous dispersion of vinyl acetate polymer, aqueous dispersion of vinyl acetate-acrylates polymer, aqueous dispersion of vinyl acetate-ethylene polymer, aqueous dispersion of ethylene-vinyl acetate polymer and aqueous dispersion of vinyl acetate-acrylates-esters of versatic acid (e.g., that available under the trademark VEOVA 10) polymer or any combination thereof. More preferably, the aqueous latex in the first coating composition for forming the hydrophobic primer comprises a combination of aqueous dispersion of styrenes-acrylates polymer and aqueous dispersion of acrylates polymer.

In the film formation process of the first coating composition, the polymer particles in the aqueous latex aggregate together with the evaporation of water in the coating composition, thereby forming a coating. On the one hand, the coating formed by the first coating composition is hydrophobic, through which liquid water does not easily penetrate. On the other hand, since the polymer particles of the aqueous latex particles in the first coating composition have an appropriate particle size range, the formed coating has a certain porosity, so that water vapor molecules inside walls can diffuse to the outside through these pores, and the formed coating has appropriate cohesive strength. If the particle size of the aqueous latex particles is too large, for example, greater than 200 nm or larger, the coating formed is not dense enough and its cohesive strength is not good;

and if the particle size of the aqueous latex particles is too small, for example, less than 50 nm or smaller, it is impossible to form a coating with porosity on the surface of walls. In the present disclosure, the coating formed by the first coating composition of the present disclosure not only has hydrophobicity, but also has a certain porosity, so that the coating has an appropriate water permeability, for example, has a water permeability of at most 0.3 mL/24 hours, preferably less than or equal to 0.2 mL/24 hours, but can be greater than or equal to 0.15 mL/24 hours, or greater than or equal to 0.1 mL/24 hours as measured according to JG/T210-2007. That is to say, the hydrophobic primer of the present disclosure is capable of decreasing penetration of water from the outside into walls since its hydrophobicity, and at the same time is capable of increasing diffusion of water vapor from the wall to the outside due to the presence of a certain pores, which allows walls coated with the coating to have a low water content for a long time, thereby inhibiting the increase in the thermal conductivity (or heat transfer coefficient) of walls caused by water absorption of the walls material, and improving the comfort of human body in the room coated with the coating composition.

As described above, the aqueous dispersion or latex may be prepared by any suitable emulsion polymerization processes which are well known to a person skilled in the art. Alternatively, as a particular example of the aqueous latex, a variety of suitable commercially available products can be used, such as aqueous latex of styrenes-acrylates polymer available from BATF Industry Co., Ltd. under the trademarks RS 998A, or RS 968; aqueous latex of acrylates polymer available from PolyWell company, under the trademark PE-2133.

Preferably, the content of the aqueous latex in the first coating composition is in the range of about 30 to 90 wt % relative to the total weight of the first coating composition. Preferably, the content of the aqueous latex in the first coating composition, based on the total weight of the first coating composition, is at least about 35 wt %, more preferably at least about 40 wt %, even more preferably at least about 45 wt % or most preferably at least about 50 wt %. And preferably, the content of the aqueous latex in the first coating composition is at most about 85% by weight, preferably at most about 80% by weight, more preferably at most about 75% by weight, still more preferably at most about 70 wt %, based on the total weight of the first coating composition.

The first coating composition used to form the hydrophobic primer is substantially free of inorganic mineral fillers.

The first coating composition for forming the hydrophobic primer may also comprise a certain amount of water to adjust viscosity of the aqueous coating composition. For example, the aqueous coating composition for forming the hydrophobic primer according to the present disclosure comprises at least 20 wt % of water, preferably 20-40 wt % of water. Of course, in the aqueous coating composition for forming the hydrophobic primer according to the present disclosure, the addition amount of water can be varied within a wider range as required, or even fall outside the above-mentioned range.

If necessary, the first coating composition used to form the hydrophobic primer may optionally contain additional additives, which do not adversely affect the coating composition or the cured coating obtained therefrom. Suitable additives include, for example, those that improve the processing or manufacturing properties of the composition, enhance the aesthetics of the composition, or improve the specific functional properties or characteristics (such as adhesion to the substrate) of the coating composition or the cured composition obtained therefrom. The additives that can be included are carriers (such as water), emulsifiers, pigments, metal powders or pastes, fillers, anti-migration aids, antibacterial agents, chain extenders, curing agents, lubricants, coagulants, lubricants, biological bactericides, plasticizers, cross-linkers, defoamers, colorants, waxes, antioxidants, corrosion inhibitors, flow control agents, thixotropic agents, dispersants, adhesion promoters, UV stabilizers, scavengers, thickeners, defoamers, pH adjustors, film forming aids, solvents, or combinations thereof. The content of each optional ingredient is sufficient to achieve its intended purpose, but preferably, such content does not adversely affect the coating composition or the cured coating obtained therefrom. In a preferred embodiment, the first coating composition of the present disclosure may contain thickeners, dispersants, wetting agents, defoamers, pH adjustors, silicone hydrophobic agents, film-forming aids, solvents, and bactericides, antifungal agents, coupling agents or any combination thereof as additional additives.

According to the present disclosure, the total amount of additional additives can vary within a wide range, for example, in the range of 0 wt % to about 20 wt %, preferably in the range of about 0.1 wt % to about 20 wt % relative to the total weight of the composition. According to the present disclosure, the preferred amount of additional additives contained in the first coating composition may be at least about 0.5 wt %, more preferably at least about 1.0 wt %, and even more preferably at least about 2.0 wt % and most preferably at least about 2.5 wt % relative to the total weight of the composition. According to the present disclosure, the preferred amount of additional additives contained in the first coating composition can be at most about 15% by weight, more preferably at most about 12% by weight, even more preferably at most about 10% by weight, and most preferably at most about 8.0 wt %, relative to the total weight of the composition.

In one embodiment of the present disclosure, the first coating composition for forming the hydrophobic primer comprises, based on the total weight of the first coating composition, 30 to 90 wt % of aqueous latex;

at least 20 wt % of water; and 0 to 20 wt % of additional additives, wherein the additional additives include thickeners, dispersants, wetting agents, defoamers, pH adjustors, silicone hydrophobic agents, film-forming aids, solvents, bactericides, and antifungal agents or any combination thereof Heat Reflective Topcoat The heat reflective topcoat of the present disclosure is formed of a second coating composition, wherein the second coating composition comprises a heat reflective filler and comprises at least 30 wt % of an aqueous latex based on the total weight of the second coating composition.

As used herein, the term "heat reflective filler" refers to fillers that improve reflective ability of a coating composition to sunlight. In the present disclosure, the topcoat containing the heat reflective fillers has a solar reflectance of at least 85%, and/or a hemispherical emittance of at least 85%. Preferably, this topcoat has a solar reflectance of at least 88%, and/or a hemispherical emittance of at least 87%.

In an embodiment of the present disclosure, the heat reflective fillers in the second coating composition comprise titanium oxide, ceramic micro-beads or any combination thereof. In a preferred embodiment of the present disclosure, the heat reflective fillers in the second coating composition includes a combination of ceramic micro-beads and titanium dioxide, and the content of such ceramic micro-beads is in the range of 5 to 15 wt % relative to the total weight of the second coating composition.

The ceramic micro-beads of the present disclosure can be translucent, high-strength fine micro-beads. In one embodiment, the ceramic micro-beads may be silicate ceramic micro-beads, preferably aluminum silicate ceramic micro-beads, more specifically alkaline aluminum silicate ceramic micro-beads. The average particle size of the ceramic micro-beads, such as D50, can vary in a wide range, for example, preferably in the range of about 1 to about 50 microns, more preferably in the range of about 3 to about 45 microns.

In one embodiment, the ceramic micro-beads may include solid ceramic micro-beads, hollow ceramic micro-beads, or a combination thereof. In a preferred embodiment, the ceramic micro-beads comprise solid ceramic micro-beads with an average particle size ($D_{50}$) in the range of about 3 microns to about 10 microns. In another preferred embodiment, the ceramic micro-beads comprise hollow ceramic micro-beads with an average particle size ($D_{50}$) in the range of about 10 to about 50 microns.

As an example of ceramic micro-beads, any suitable commercially available product can be used, such as Zeeospheres™ W-610 solid ceramic micro-beads available from 3M Corporation, US or LJTF-01 hollow ceramic micro-beads available from Guangzhou Lianjie Trading Co., Ltd.

Titanium dioxide of the present disclosure is a commonly used filler in the coating field for preparing a reflective thermal insulation coating composition. In one embodiment, titanium dioxide may be rutile titanium dioxide.

As an example of titanium dioxide, any suitable commercially available product can be used, such as R706 rutile titanium dioxide available from DuPont.

According to the present disclosure, the content of the heat reflective fillers is in the range of about 20 wt % to about 40 wt %, preferably in the range of about 20 wt % to about 33 wt % relative to the total weight of the second coating composition. Preferably, the content of the ceramic micro-beads in the heat reflective fillers is in the range of about 5 to 12 wt % relative to the total weight of the second coating composition.

It is surprisingly found by the present inventors that the second coating composition of the present disclosure can form a coating with excellent heat reflectivity when it contains 20 to 40 wt % of heat reflective fillers composed of rutile titanium dioxide and ceramic micro-beads. In addition, it is also found by the inventors that the combination of hollow ceramic micro-beads and solid ceramic micro-beads as heat-reflective fillers can greatly reduce the amount of ceramic micro-beads used as heat-reflective fillers without compromising heat reflectivity of the coating.

Without wishing to be bound by any theory, the inventor believes that during the film formation process of the second coating composition, the ceramic micro-beads contained in the composition tend to migrate to the coating surface to form a ceramic micro-beads-rich surface layer, which layer will improve the surface properties of the coating, such as increase the heat reflectivity of the surface.

In addition to heat reflective fillers such as ceramic micro-beads and titanium dioxide, the second coating composition of the present disclosure may also contain any other fillers suitable for use in the coating composition. Hereinafter, for the convenience of discussion, the fillers other than the heat-reflective fillers incorporated into the interior wall coating composition are referred to as "additional fillers". Suitable examples of additional fillers include, for example, kaolin, diatomaceous earth, calcium carbonate, talc, barium sulfate, magnesium aluminum silicate, silica, and any combination thereof. In a preferred embodiment, the filler may include kaolin, diatomaceous earth, calcium carbonate, or a combination thereof.

In the present disclosure, the amount of the additional filler can be determined by those skilled in the art according to needs. Preferably, the second coating composition comprises 1 to 5 wt % of additional fillers relative to the total weight of the second coating composition.

The second coating composition of the present disclosure further includes an aqueous latex. The aqueous latex may have the same or similar composition as the aqueous latex involved in the aforementioned aqueous coating composition for forming a thermal insulation coating, but may also be a different aqueous latex. Preferably, the aqueous latex in the second coating composition is the same as or similar to the aqueous latex in the aqueous coating composition for forming a thermal insulation coating to facilitate adhesion between the coatings.

In some embodiments of the present disclosure, the aqueous latex in the second coating composition comprises aqueous dispersion of organic silicones, aqueous dispersion of styrenes-acrylates polymer, aqueous dispersion of acrylates polymer, aqueous dispersion of organic silicones modified acrylates polymer, aqueous dispersion of vinyl acetate polymer, aqueous dispersion of vinyl acetate-acrylates polymer, aqueous dispersion of vinyl acetate-ethylene polymer, aqueous dispersion of ethylene-vinyl acetate polymer and aqueous dispersion of vinyl acetate-acrylates-esters of versatic acid (e.g., that available under the trademark VEOVA 10) polymer or any combination thereof, preferably comprises aqueous dispersion of acrylates polymer.

As described above, the aqueous dispersion or latex may be prepared by any suitable emulsion polymerization processes which are well known to a person skilled in the art. Alternatively, as a particular example of the aqueous latex, a variety of suitable commercially available products can be used, such as aqueous latex of acrylates polymer available from Henkel, under the trademark GD56.

Preferably, the content of the aqueous latex in the second coating composition is in the range of about 30 to 78 wt % relative to the total weight of the second coating composition. Preferably, the content of the aqueous latex in the second coating composition, based on the total weight of the second coating composition, is at least about 35 wt %. And preferably, the content of the aqueous latex in the second coating composition is at most about 75% by weight, preferably at most about 70% by weight, more preferably at most about 65% by weight, most preferably at most about 60 wt %, based on the total weight of the second coating composition.

If necessary, the second coating composition of the present disclosure may optionally contain additional additives, which do not adversely affect the coating composition or the cured coating obtained therefrom. Suitable additives include, for example, those that improve the processing or manufacturing properties of the composition, enhance the aesthetics of the composition, or improve the specific functional properties or characteristics (such as adhesion to the substrate) of the coating composition or the cured composition obtained therefrom. The additives that can be included are carriers, emulsifiers, pigments, metal powders or pastes, fillers, anti-migration aids, antibacterial agents, chain extenders, curing agents, lubricants, coagulants, lubricants, biological bactericides, plasticizers, crosslinkers, defoamers, colorants, waxes, antioxidants, corrosion inhibitors, flow control agents, thixotropic agents, dispersants, adhesion promoters, UV stabilizers, scavengers, thickeners, defoamers, pH adjustors, film forming aids, solvents, or combinations thereof. The content of each optional ingredient is sufficient to achieve its intended purpose, but preferably, such content does not adversely affect the coating composition or the cured coating obtained therefrom. In a preferred embodiment, the second coating composition of the present disclosure may contain thickeners, dispersants, defoamers, pH adjustors, film-forming aids, solvents, and bactericides, antifungal agents, silane coupling agents or any combination thereof as additional additives.

In one embodiment of the present disclosure, the second coating composition comprises, based on the total weight of the second coating composition, 30 to 80 wt % of aqueous latex;

20 to 40 wt % of heat reflective fillers; and 0 to 40 wt % of additional additives, wherein the additional additives include additional fillers, thickeners, dispersants, defoamers, pH adjustors, film-forming aids, solvents, bactericides, and antifungal agents, coupling agents or any combination thereof.

The inventors of the present disclosure surprisingly found that combining the thermal insulation coating according to the present disclosure with the above mentioned hydrophobic primer and heat reflective topcoat containing a higher resin content makes the thermal insulation coating to have a good adhesion with the hydrophobic primer and the heat reflective topcoat without lamination, so that a reflective thermal insulation coating system with stable structural stability is obtained, and the resulting reflective thermal insulation coating system has a good combined thermal reflective and thermal insulation performances.

Therefore, in an embodiment according to the present disclosure, the reflective thermal insulation coating system comprising the primer coating, the thermal insulation coating and the topcoat can be applied to various building walls to improve the thermal insulation performance of the building walls. In a particular embodiment, the building walls comprises architectural materials including concrete mass, plaster board, lime-sand brick, aerated concrete, lightweight multilayer plate, fiber cement board or any combination thereof.

Hereinafter, the present disclosure will be described in detail through examples. However, the present disclosure is not limited to these examples.

EXAMPLES

Test Methods

Tensile strength and elongation at break were measured in accordance with section 7.15 of the construction industry standard JG/T172-2014.

Water permeability was measured in accordance with the construction industry standard JG/T 210-2007.

Solar reflectance was measured in accordance with the architectural reflective insulation coatings standard JG/T 235-2014.

Hemispherical emittance was measured in accordance with the architectural reflective insulation coatings standard JG/T 235-2014.

Thermal conductivity was measured in accordance with the national standard GB/T25261-2018.

Example 1: Thermal Insulation Coating

The ingredients used for formulating the aqueous coating composition to form the thermal insulation coating are shown in Table 1 below.

TABLE 1

| Ingredients | Supplier/Manufacturer | Description |
|---|---|---|
| RS-998A | BATF Industry Co., Ltd. | Aqueous styrene-acrylate latex |
| Archsol ®8016 | Wanhua Chemical Company | Aqueous acrylates latex |
| Lauryl alcohol ester | General industrial products | Film-forming aids |
| Ethylene glycol | General industrial products | Solvent |
| Aerogel GM200 | General industrial products | Aerogel |
| MH-80W15 | General industrial products | Expanded beads with a particle size of 80 microns |
| Hollow glass micro-beads K1 | General industrial products | Soda lime borosilicate glass, with a particle size of 15-120 microns |
| Aerogel G500 | General industrial products | Aerogel with a particle size of 30 nm |
| Vitrified micro-beads | General industrial products | Vitrified beads with a particle size of 50-200 microns |

The coating composition (including sample 1 and control samples A-C) for forming the thermal insulation coating was prepared as follows.

Under low-speed stirring of 350-450 rpm/min, to a stirrer 90 g of deionized water and a certain amount of thickener, dispersant, wetting agent, defoamer, pH adjustor, aqueous acrylic latex 8016 and aqueous styrene-acrylic latex 998A were added, and the resulting mixture was stirred for 5-10 minutes until homogeneous. Then, the thermal insulation material (in which the expanded organic polymer micro-beads MH-80W15 was added in Example 1, the hollow glass micro-beads K1 was added in Comparative Example A, the aerogel G500 was added in Comparative Example B; and the vitrified micro-beads was added to Comparative Example C), aerogel GM200 and 20 g of deionized water was added to the stirrer. After the feeding was completed, the resulting mixture was dispersed at a high speed of 800-1250 rpm for 20 to 30 minutes to form a uniform slurry. Then the slurry was pumped into a mixing tank, and agitated at a medium speed of 500 to 700 rpm, and finally ethylene glycol, lauryl alcohol ester, bactericide, antifungal agent and deionized water were added to form an aqueous coating composition for thermal insulation coating. The amounts of each component in the aqueous coating composition of Sample 1 and Comparative Samples A-C were listed in Table 2.

TABLE 2

| The ingredients of aqueous coating compositions for forming thermal insulation coatings and properties of the aqueous coating compositions | | | | |
|---|---|---|---|---|
| Components | Sample 1 | Control sample A | Control sample B | Control sample C |
| Aqueous acrylic latex (Wanhua 8016) | 300 | 300 | 300 | 300 |

TABLE 2-continued

The ingredients of aqueous coating compositions for forming thermal insulation
coatings and properties of the aqueous coating compositions

| Components | Sample 1 | Control sample A | Control sample B | Control sample C |
|---|---|---|---|---|
| Aqueous styrene acrylic latex (BATF 998A) | 400 | 400 | 400 | 400 |
| Thermal Insulation Materials | Expanded micro-beads 50 | Glass micro-beads 50 | Aerogel G500 50 | Vitrified micro-beads 50 |
| Aerogel G200 | 30 | 30 | 30 | 30 |
| Dispersant | 12 | 12 | 12 | 12 |
| Thickener | 7.2 | 7.2 | 7.2 | 7.2 |
| Defoamer | 5 | 5 | 5 | 5 |
| Wetting agent | 2 | 2 | 2 | 2 |
| pH adjustor | 2 | 2 | 2 | 2 |
| Ethylene glycol | 15 | 15 | 15 | 15 |
| Lauryl alcohol ester | 25 | 25 | 25 | 25 |
| Fungicide | 2 | 2 | 2 | 2 |
| Antifungal agent | 2 | 2 | 2 | 2 |
| Deionized water | 135.8 | 135.8 | 135.8 | 135.8 |
| Properties | | | | |
| Storage state in tank | No delamination | Delamination, with lower clear liquid of about 0.5 mm | No delamination | Delamination, with upper clear liquid of about 1 mm |
| Tensile Strength | 0.75 MPa | 1.20 MPa | Unpredictable | 0.3 MPa |
| Thermal conductivity W/(m · K) | 0.048 | 0.06 | 0.058 | 0.14 |
| State of Dry film | With greater resilience, good flexibility, keeping normal when it is bent at 1 mm, and elongation at break of 100% | With strong rigidity, poor flexibility, and cracking when it is bent at 2 mm | With good flexibility, but no resilience and easy to deform | Being brittle, poor flexibility, and cracking when it is bent at 8 mm |

From the results in Table 2 above, it can be clearly seen that the aqueous coating composition for a thermal insulation coating for walls formed by the combination of a large amount of aqueous latex and expanded organic polymer micro-beads not only has excellent stability, but also has excellent elasticity and can resist cracking.

Example 2: Coating System

Putty Layer

The coating composition for forming a hydrophobic putty layer was prepared based on the components and the amounts shown in Table 3. Cement, quartz sand, heavy calcium carbonate, EVA rubber powder, thickening agent and organosilicone hydrophobic agent were sequentially added to a dry powder putty mixing stirrer and agitated evenly, thereby obtaining a coating composition of the putty layer. The amount of each component in the sample used to form the putty layer was listed in Table 3.

TABLE 3

Ingredients of coating composition for forming
putty layer and their amount

| Composition | Amount (g) |
|---|---|
| 42.5 Cement | 30 |
| EVA Rubber Powder | 3 |

TABLE 3-continued

Ingredients of coating composition for forming
putty layer and their amount

| Composition | Amount (g) |
|---|---|
| 200 mesh Quartz Sand | 48 |
| 325 mesh Heavy Calcium Carbonate | 18 |
| Cellulose Thickener | 0.78 |
| Starch Ethers thickener | 0.02 |
| Silicone Hydrophobic Agent | 0.2 |
| Total | 100 |

Hydrophobic Primer

The first coating composition for forming the hydrophobic primer was prepared according to the components and amounts shown in Table 4.

Under low-speed stirring of 350-450 rpm/min, to a stirrer 200 g of deionized water and the thickener, dispersant, wetting agent, defoamer, and pH adjustor were added, and the resulting mixture was stirred for 5-10 minutes until homogeneous. Then, deionized water was added to the stirrer, and the resulting mixture was dispersed at a high speed of 800-1250 rpm for 20 to 30 minutes to form a uniform slurry. Then at a medium speed of 500 to 700 rpm, to the slurry ethylene glycol, lauryl alcohol ester, silicone hydrophobic agent, latex combination including aqueous acrylic latex 2133 and aqueous styrene-acrylic latex RS-998A, bactericide, antifungal agent, silane coupling agent and remaining deionized water were added to form the first coating composition. The amounts of each component in the coating composition for forming hydrophobic primer were listed in Table 4.

TABLE 4

The composition of the first coating compositions for forming hydrophobic primer and performances of the hydrophobic primer

| Composition | Amount (g) |
| --- | --- |
| Aqueous styrene acrylic latex RS-998A with a z average particle size 120 nm | 300 |
| Aqueous acrylic latex PE-2133 with a z average particle size 80-100 nm | 300 |
| Dispersant | 12 |
| Thickener | 7.2 |
| Wetting agent | 2 |
| Defoamer | 5 |
| pH Adjustor | 2 |
| Silicone Hydrophobic agent | 10 |
| Fungicide | 2 |
| Antifungal agent | 2 |
| Silane Coupling agent | 2 |
| Lauryl alcohol Ester | 25 |
| Ethylene glycol | 15 |
| Deionized water | 300.8 |
| Property | |
| Water permeability (mL/24 hours) | 0.2 |

It can be clearly seen from the results of Table 4 above that the coating composition used to form the hydrophobic primer contained a relatively large amount of aqueous latex having a suitably low z-average particle size, and was substantially free of inorganic mineral fillers. The primer formed by the coating composition had hydrophobicity and a certain porosity, whose water permeability was 0.2 mL/24 hours, so the primer layer can produce a breathable and hydrophobic effect. While the traditional common coating composition cannot obtain a coating with ideal water permeability, and cannot obtain the breathable and hydrophobic effect obtained by the present disclosure.

Thermal Reflective Topcoat

The second coating composition for forming the thermal reflective topcoat was prepared according to the components and amounts shown in Table 5.

Under low-speed stirring of 350-450 rpm/min, to a stirrer 160 g of deionized water and the thickener, dispersant, defoamer, and pH adjustor were added, and the resulting mixture was stirred for 5-10 minutes until homogeneous. Then, to the mixture, titanium dioxide, diatomaceous earth, solid ceramic micro-beads, hollow ceramic micro-beads and deionized water were added, and the resulting mixture was dispersed at a high speed of 800-1250 rpm for 20 to 30 minutes to form a uniform slurry. Then at a medium speed of 500 to 700 rpm, to the slurry lauryl alcohol ester, bactericide, antifungal agent, aqueous acrylic latex GD56, propylene glycol, silane coupling agent and remaining deionized water were added to form the second coating composition. The amounts of each component in the second coating composition for forming thermal reflective topcoat were listed in Table 5.

TABLE 5

The composition of the second coating compositions for forming thermal reflective topcoat and performances of the thermal reflective topcoat

| Composition | Amount (g) |
| --- | --- |
| Aqueous acrylic latex (Henkel GD56) | 380 |
| Solid ceramic micro-beads | 60 |
| Hollow ceramic micro-beads | 50 |
| Titanium Dioxide | 210 |
| Diatomite | 20 |
| Dispersant | 8 |
| Thickener | 5 |
| Defoamer | 20 |
| pH Adjustor | 2 |
| Silane coupling agent | 2 |
| Fungicide | 2 |
| Antifungal agent | 2 |
| Lauryl Alcohol Ester | 20 |
| Propylene Glycol | 20 |
| Deionized water | 219 |
| Total | 1000 |
| Properties | |
| Solar reflectance | 88% |
| hemispherical emittance | 87% |

From the results in Table 5 above, it can be clearly seen that the coating composition used to form the heat reflective topcoat contained hollow ceramic micro-beads, solid ceramic micro-beads and titanium dioxide and other heat reflective fillers, and contained at least 30 wt % of aqueous latex, and the top coat formed by such a coating composition had strong heat reflectivity.

Coating System

On a standard test substrate, the putty layer, the hydrophobic primer, the thermal insulation coating and the heat reflective topcoat were sequentially coated. In this way, a heat-reflective thermal insulation coating system was obtained. The coating system obtained above had excellent structural stability without delamination. Moreover, the coating system of the present disclosure can maintain its excellent thermal insulation performance even if exposed to the external environment for a long time, and can meet the requirements for energy saving on the market.

While the invention has been described with respect to a number of embodiments and examples, those skilled in the art, having benefit of this disclosure, will appreciate that other embodiments can be devised which do not depart from the scope and spirit of the invention as disclosed herein.

What is claimed is:

1. An aqueous coating composition for forming a thermal insulation coating for walls, comprising, based on total weight of the aqueous coating composition:

at least 65 wt % of an aqueous dispersion of polymer particles;

at least 5 wt % of expanded organic polymer micro-beads;

at least 10 wt % of water;

0 to 5 wt % of an aerogel; and 0 to 15 wt % of additional additives, comprising thickeners, dispersants, wetting agents, defoamers, pH adjustors, film-forming aids, hydrophobic agents, coupling agents, bactericides, and antifungal agents or any combination thereof, wherein the aqueous coating composition is substantially free of inorganic mineral fillers.

2. The aqueous coating composition of claim 1, wherein the expanded organic polymer micro-beads have at least one of a moisture content of 70% or higher or a solid content of 15-20 wt %.

3. The aqueous coating composition of claim 1, wherein the expanded organic polymer micro-beads are hollow and have a particle size in the range of 50-100 microns.

4. The aqueous coating composition of claim 1, wherein the aqueous dispersion of polymer particles is one or more selected from the group consisting of aqueous dispersion of organic silicones, aqueous dispersion of styrenes-acrylates polymer, aqueous dispersion of acrylates polymer, aqueous dispersion of organic silicones modified acrylates polymer, aqueous dispersion of vinyl acetate polymer, aqueous dispersion of vinyl acetate-acrylates polymer, aqueous dispersion of vinyl acetate-ethylene polymer, aqueous dispersion of ethylene-vinyl acetate polymer and aqueous dispersion of vinyl acetate-acrylates-ester of versatic acid polymer.

5. The aqueous coating composition of claim 1, comprising, based on the total weight of the aqueous coating composition:

65 wt % to 80 wt % of the aqueous dispersion of polymer particles;
5 wt % to 15 wt % of the expanded organic polymer micro-beads;
10 wt % to 12 wt % of water;
0.1 to 4 wt % of the aerogel; and
0.1 to 10 wt % of additional additives, comprising thickeners, dispersants, wetting agents, defoamers, pH adjustors, film-forming aids, hydrophobic agents, coupling agents, bactericides, and antifungal agents or any combination thereof.

6. The aqueous coating composition of claim 1, wherein the aqueous coating composition has a solid content of 70 wt % or higher.

7. The aqueous coating composition of claim 1, wherein the aqueous coating composition is configured to stand at room temperature for 1 week or longer without delamination.

8. A reflective thermal insulation coating system for walls, comprising:

a thermal insulation coating formed from an aqueous coating composition that comprises, based on total weight of the aqueous coating composition:
at least 65 wt % of an aqueous dispersion of polymer particles;
at least 5 wt % of expanded organic polymer micro-beads;
at least 10 wt % of water;
0 to 5 wt % of an aerogel; and
0 to 15 wt % of additional additives, comprising thickeners, dispersants, wetting agents, defoamers, pH adjustors, film-forming aids, hydrophobic agents, coupling agents, bactericides, and antifungal agents or any combination thereof,
wherein the aqueous coating composition is substantially free of inorganic mineral fillers.

9. The reflective thermal insulation coating system of claim 8, wherein the thermal insulation coating formed from the aqueous coating composition has at least one or more of the following:

a thickness in the range of 1-5 mm,
an elongation at break in the range of 50%-120%, and/or
a thermal conductivity of 0.050 w/m·K or lower.

10. The reflective thermal insulation coating system of claim 8, further comprising:

(A) a hydrophobic primer, having a water permeability of at most 0.3 mL/24 hours;
(B) the thermal insulation coating formed from the aqueous coating composition; and
(C) a thermal reflective topcoat, having a solar reflectance of at least 85% and/or a hemispherical emittance of at least 85%.

11. The reflective thermal insulation coating system of claim 10, wherein the hydrophobic primer is formed from a first coating composition, and the first coating composition comprises at least 30% by weight of an aqueous dispersion of polymer particles based on the total weight of the first coating composition.

12. The reflective thermal insulation coating system of claim 11, wherein the first coating composition for forming the hydrophobic primer comprises, based on the total weight of the first coating composition:

30 to 90 wt % of aqueous dispersion of polymer particles;
at least 20 wt % of water; and
0 to 20 wt % of additional additives, wherein the additional additives include thickeners, dispersants, wetting agents, defoamers, pH adjustors, silicone hydrophobic agents, film-forming aids, solvents, bactericides, and antifungal agents or any combination thereof,
wherein the first coating composition used to form the hydrophobic primer is substantially free of inorganic mineral filler.

13. The reflective thermal insulation coating system of claim 10, wherein the thermal reflective topcoat is formed by a second coating composition, and the second coating composition comprises a heat reflective filler, and at least 30 wt % of an aqueous dispersion of polymer particles based on the total weight of the second coating composition.

14. The reflective thermal insulation coating system of claim 13, wherein the second coating composition for forming the thermal reflective topcoat comprises, based on the total weight of the second coating composition:

30 to 80 wt % of aqueous dispersion of polymer particles;
20 to 40 wt % of heat reflective fillers; and
0 to 40 wt % of additional additives, wherein the additional additives include additional fillers, thickeners, dispersants, defoamers, pH adjustors, film-forming aids, solvents, bactericides, and antifungal agents, coupling agents or any combination thereof.

15. An aqueous coating composition for forming a thermal insulation coating for walls, comprising, based on total weight of the aqueous coating composition:

at least 65 wt % of an aqueous dispersion of polymer particles;
5 wt % to 20 wt % of expanded organic polymer micro-beads;
at least 10 wt % of water;
0 to 5 wt % of an aerogel; and
0 to 15 wt % of additional additives, comprising thickeners, dispersants, wetting agents, defoamers, pH adjustors, film-forming aids, hydrophobic agents, coupling agents, bactericides, and antifungal agents or any combination thereof,
wherein the aqueous coating composition is substantially free of inorganic mineral fillers, and wherein the aqueous coating composition has a solid content of 70 wt % or higher.

16. The aqueous coating composition of claim 15, wherein the expanded organic polymer micro-beads have at least one of a moisture content of 70% or higher or a solid content of 15-20 wt %.

17. The aqueous coating composition of claim 15, wherein the expanded organic polymer micro-beads have a particle size in the range of 50-100 microns and are hollow.

18. The aqueous coating composition of claim 15, wherein the aqueous dispersion of polymer particles is selected from the group consisting of aqueous dispersion of organic silicones, aqueous dispersion of styrenes-acrylates polymer, aqueous dispersion of acrylates polymer, aqueous dispersion of organic silicones modified acrylates polymer, aqueous dispersion of vinyl acetate polymer, aqueous dispersion of vinyl acetate-acrylates polymer, aqueous dispersion of vinyl acetate-ethylene polymer, aqueous dispersion of ethylene-vinyl acetate polymer, aqueous dispersion of vinyl acetate-acrylates-ester of versatic acid polymer, and combinations thereof.

19. The aqueous coating composition of claim 15, wherein the polymer particles have a z-average particle size of 50 nm to 200 nm.

20. The aqueous coating composition of claim 15, wherein the aqueous coating composition is configured to stand at room temperature for 1 week or longer without delamination.

\* \* \* \* \*